(12) United States Patent
Yang et al.

(10) Patent No.: US 10,520,069 B2
(45) Date of Patent: Dec. 31, 2019

(54) BALL SCREW

(71) Applicant: HIWIN TECHNOLOGIES CORP., Taichung (TW)

(72) Inventors: Chia-Ming Yang, Taichung (TW); Yen-Wei Lin, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 55 days.

(21) Appl. No.: 15/864,338

(22) Filed: Jan. 8, 2018

(65) Prior Publication Data
US 2019/0211906 A1    Jul. 11, 2019

(51) Int. Cl.
*F16H 25/22*    (2006.01)

(52) U.S. Cl.
CPC ............................... *F16H 25/2219* (2013.01)

(58) Field of Classification Search
CPC .......................... F16H 25/2219; F16H 25/2214
USPC ............................... 74/89.23, 424.86, 424.87
See application file for complete search history.

(56) References Cited

U.S. PATENT DOCUMENTS

| | | | |
|---|---|---|---|
| 5,373,755 A * | 12/1994 | Rohlinger | F16H 25/2214 74/424.86 |
| 5,586,469 A * | 12/1996 | Mitani | B24B 19/022 74/424.86 |
| 6,450,055 B1 * | 9/2002 | Sekiya | F16H 25/2214 74/424.87 |
| 6,581,489 B2 * | 6/2003 | Ohkubo | F16H 25/2214 74/424.86 |
| 6,675,669 B2 * | 1/2004 | Sekiya | F16H 25/2214 74/424.87 |
| 7,234,368 B1 * | 6/2007 | Lin | F16H 25/2214 74/424.83 |
| 2002/0023513 A1 * | 2/2002 | Sekiya | F16H 25/2214 74/424.87 |
| 2003/0172759 A1 * | 9/2003 | Hayashi | F16H 25/2214 74/424.86 |
| 2010/0126292 A1 * | 5/2010 | Lin | F16H 25/2214 74/424.87 |

(Continued)

FOREIGN PATENT DOCUMENTS

| | | |
|---|---|---|
| DE | 10161290 A1 | 8/2002 |
| JP | H07-167243 A | 7/1995 |

(Continued)

*Primary Examiner* — Jake Cook
*Assistant Examiner* — Gregory Robert Weber
(74) *Attorney, Agent, or Firm* — Muncy, Geissler, Olds & Lowe, P.C.

(57) ABSTRACT

A ball screw includes a load path and a non-load path defined between the screw shaft and the screw nut with the two ends of the non-load path respectively connected to the load path and a reflow channel of the return tube. The ball screw defines an imaginary horizontal plane and an imaginary sloping surface that are intersected with each other at the center axis of the screw shaft. The imaginary horizontal plane passes through the non-load path. The imaginary sloping surface passes through the junction between the non-load path and the load path. The imaginary sloping surface defines a negative included angle within 1~3 degrees with respect to the imaginary horizontal plane to reduce the impact force rendered by each rolling member to the return tube, enhancing operational smoothness and reducing operational noise.

5 Claims, 7 Drawing Sheets

(56) References Cited

U.S. PATENT DOCUMENTS

| | | | | |
|---|---|---|---|---|
| 2010/0180707 A1* | 7/2010 | Wu | ................... | F16C 29/0609 |
| | | | | 74/424.87 |
| 2012/0132025 A1* | 5/2012 | Sakurai | ............... | F16H 25/2214 |
| | | | | 74/424.87 |
| 2015/0152946 A1* | 6/2015 | Piltz | ................... | F16H 25/2214 |
| | | | | 74/424.87 |

FOREIGN PATENT DOCUMENTS

| JP | 2002-181155 A | 6/2002 |
|---|---|---|
| WO | 2011077622 A1 | 6/2011 |

\* cited by examiner

BALL SCREW

BACKGROUND OF THE INVENTION

1. Field of the Invention

The present invention relates to ball screw technology and more particularly, to a ball screw that effectively improves operational smoothness and reduces operation noise.

2. Description of the Related Art

Ball screw achieves high-precision transmission by means of rolling movement of balls in between a screw shaft and a screw nut. In order to cooperate with the rolling path of the ball, the ball screw is provided with a return tube in the screw nut so that the balls can pass through the reflow channel of the return tube to achieve the reflow effect after getting off the load path between the screw shaft and the screw nut.

However, during the return of the balls, the impact force on the return tube has a great concern with the angle of the balls off the load path. If the impact force is too large, it will inevitably affect operational smoothness and production of noises. Therefore, how to change the ball off-angle to reduce the impact of the balls on the return tube is really an urgent problem to be solved by the industry.

SUMMARY OF THE INVENTION

The present invention has been accomplished under the circumstances in view. It is the main object of the present invention to provide a ball screw that enhances operational smoothness and reduces operational noise.

To achieve this and other objects of the present invention, a ball screw comprises a screw shaft, a screw nut, a return tube, a plurality of rolling members and a deflector. The screw shaft comprises an external thread groove around the periphery thereof. The screw nut is threaded onto the screw shaft and movable axially along the screw shaft. The screw nut comprises an internal thread groove and two guide grooves on an inner peripheral surface thereof. The internal thread groove of the screw nut defines with the external thread groove of the screw shaft a load path. Each guide groove of the screw nut defines with the external thread groove of the screw shaft a respective non-load path. Each non-load path has one end thereof connected to the load path. The return tube is mounted in the screw nut, defining therein a reflow channel. The reflow channel has two opposite ends thereof respectively connected to an opposite end of each said non-load path so that the reflow channel, the two non-load paths and the load path create a circulation path for accommodating said rolling members. The rolling members are movably mounted in the circulation path. The deflector is mounted between the screw shaft and the screw nut. The deflector comprises a guide portion located on each of two opposite ends thereof and respectively disposed in the non-load path. Thus, the deflector can use the guide portions to guide each rolling member from the non-load paths to the reflow channel for circulation. Further, the ball screw defines an imaginary horizontal plane and an imaginary sloping surface. The imaginary horizontal plane intersects the imaginary sloping surface at the center axis of the screw shaft. The imaginary horizontal plane passes through the non-load paths. The imaginary sloping surface passes through the junction between the non-load paths and the load path. The imaginary sloping surface defines a negative included angle with respect to the imaginary horizontal plane. This negative included angle ranges from 1 to 3 degrees.

Preferably, the screw nut comprises two mounting holes located on an outer peripheral surface thereof; the return tube has the two opposite ends thereof respectively mounted in said mounting holes.

Preferably, the cross section of the deflectors is formed of two semicircles of the same diameter but different center of circle.

Preferably, the deflector further comprises a recess located on each end thereof and abutted to the respective guide portion. The recess is engaged with respective one end of the return tube, preventing interference between the deflector and the return tube.

Preferably, the deflector has an outer diameter gradually reducing from the midpoint toward the two opposite ends thereof, and the outer diameter of the deflector is in the range of 0.8~1.1 times of the outer diameter of the rolling members.

Thus, the ball screw of the present invention effectively changes the angle at which the rolling member is released from the load path so that the impact force exerted on the return tube by the rolling member upon entering the reflow channel can be minimized, smoothening the operation and reducing operational noise.

Other advantages and features of the present invention will be fully understood by reference to the following specification in conjunction with the accompanying drawings, in which like reference signs denote like components of structure.

DETAILED DESCRIPTION OF THE INVENTION

Figure 1:
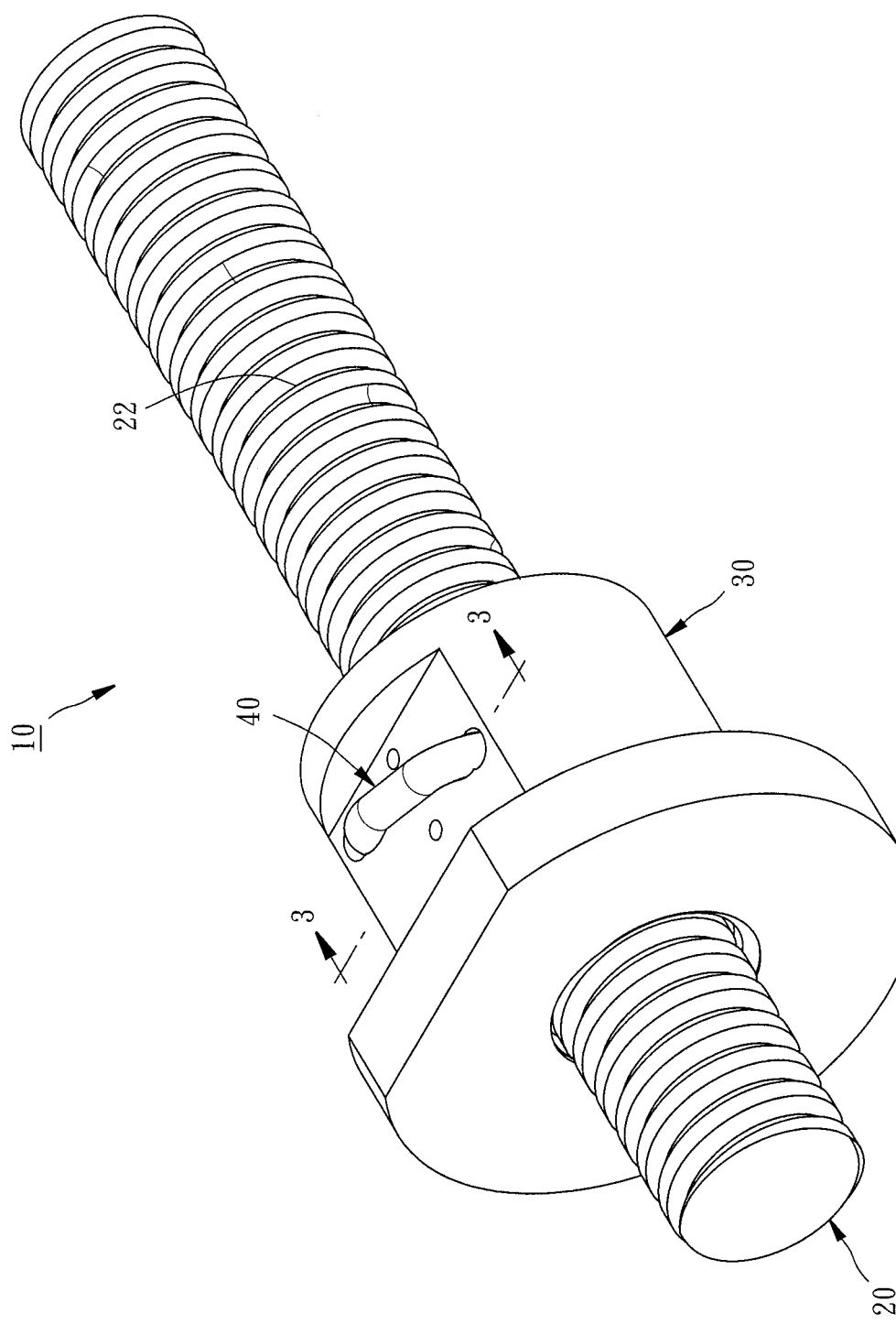
FIG. 1 is an elevational of a ball screw in accordance with the present invention.
Figure 2:
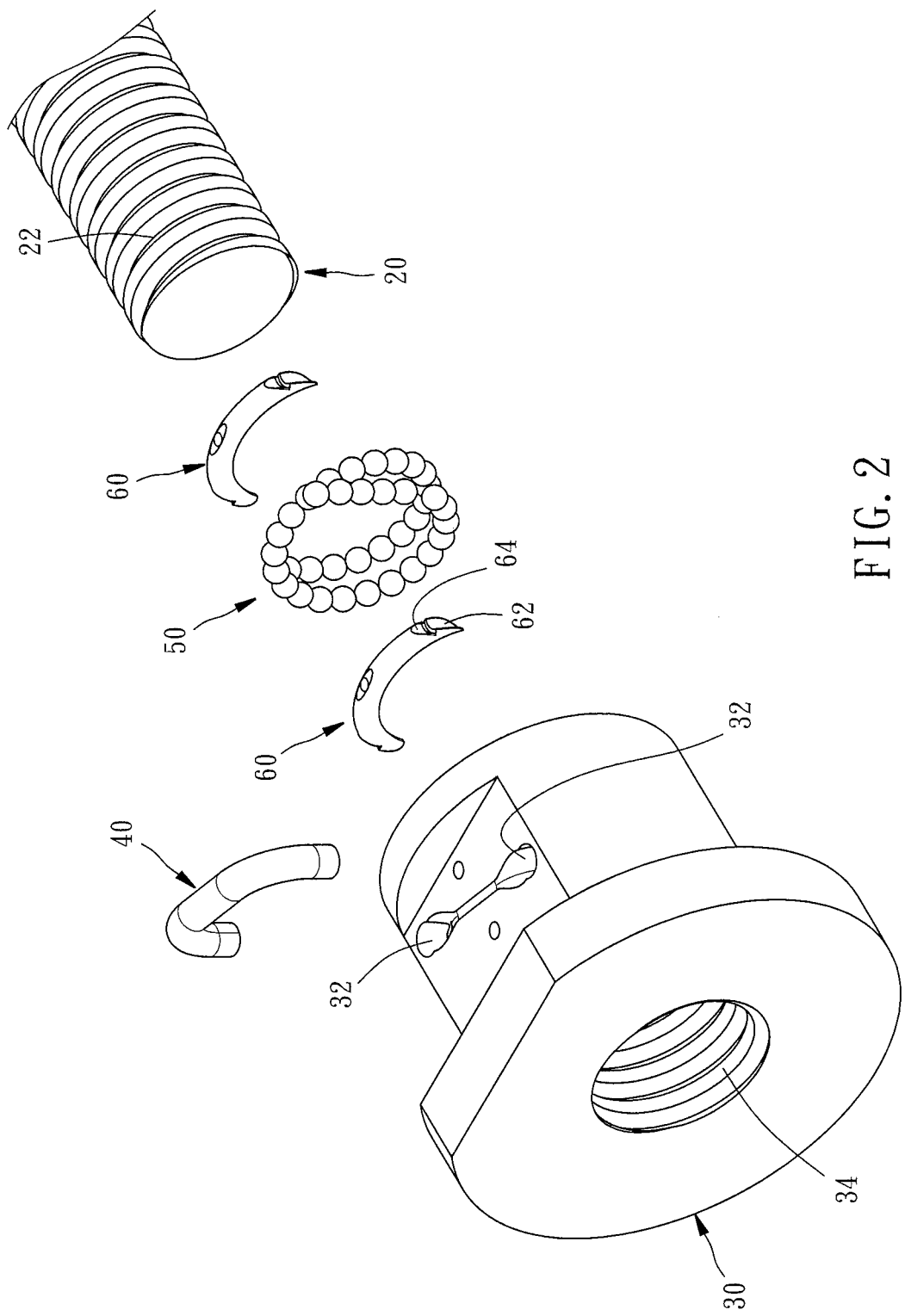
FIG. 2 is an exploded view of the ball screw in accordance with the present invention.
Figure 3:
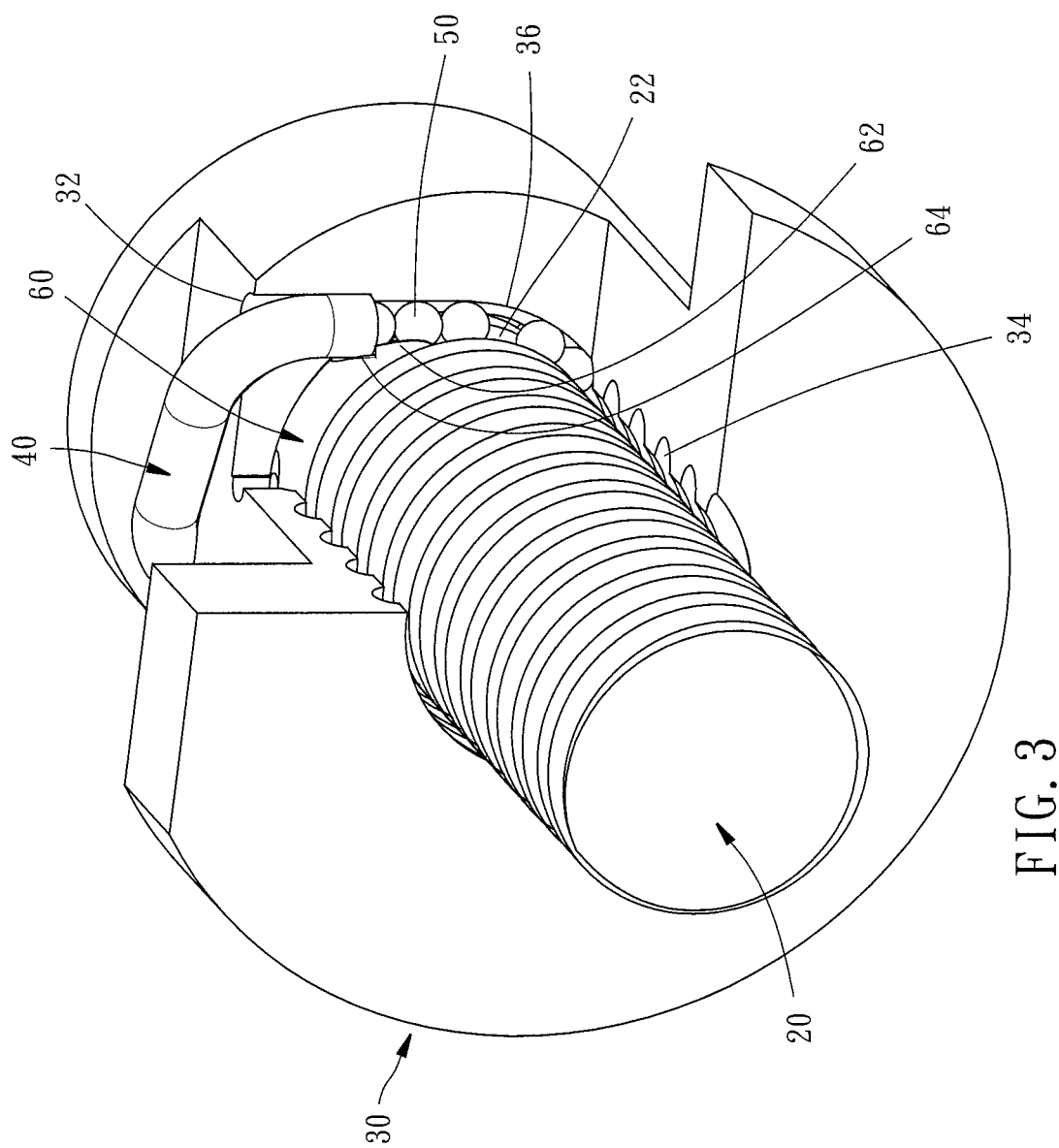
FIG. 3 is a partial sectional view of the ball screw in accordance with the present invention.

Referring to FIGS. 1-3, a ball screw 10 in accordance with a first embodiment of the present invention is shown. As illustrated, the ball screw 10 comprises a screw shaft 20, a screw nut 30, a return tube 40, a plurality of rolling members 50 and two deflectors 60.

The screw shaft 20 comprises an external thread groove 22 around the periphery thereof.

The screw nut 30 is threaded onto the screw shaft 20 for axial movement along the screw shaft 20. The screw nut 30 comprises two mounting holes 32 located on an outer peripheral surface thereof, an internal thread groove 34 spirally extended around an opposing inner peripheral surface thereof and defining with the external thread groove 22 of the screw shaft 20 a load path 52 (see FIG. 4), a guide groove 36 located on the inner peripheral surface corresponding to one respective mounting hole 32 and defining with a respective part of the external thread groove 22 of the screw shaft 20 a respective non-load path 54 (see FIG. 4) that has one end thereof connected to the load path 52.

Figure 4:
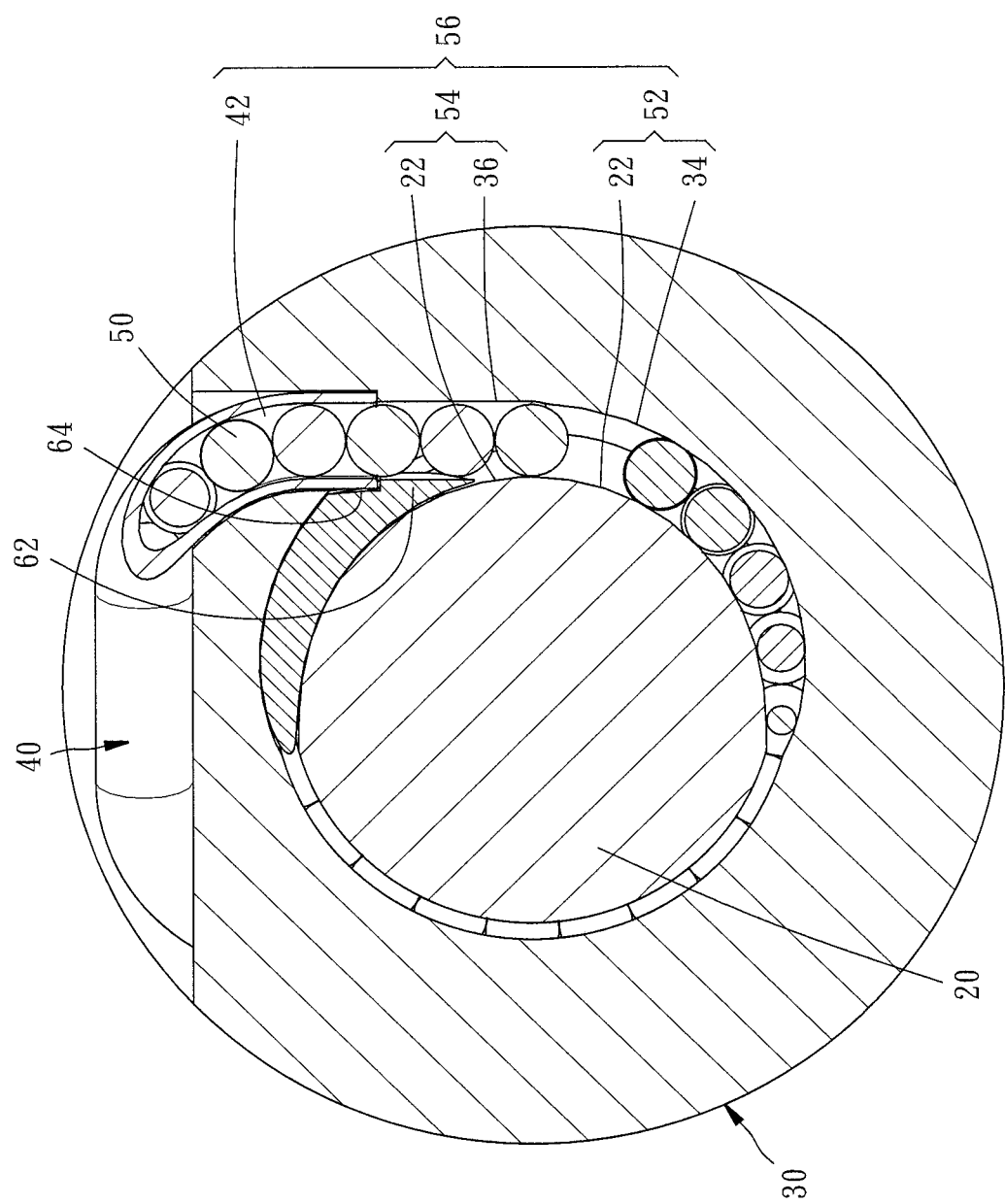
FIG. 4 is a sectional end view of the ball screw in accordance with the present invention.

The return tube 40 has two opposite ends thereof respectively inserted into the mounting holes 32 of the screw nut 30, defining therein a reflow channel 42 (see FIG. 4). The reflow channel 42 has two opposite ends thereof respectively disposed in communication with the two mounting holes 32 of the screw nut 30 so that each of the two opposite ends of the reflow channel 42 is connected to an opposite end of one respective non-load path 54. Thus, the reflow channel 42, the non-load paths 54 and the load path 52 create a circulation path 56 (see FIG. 4) for the running of each rolling member 50.

Figure 5:
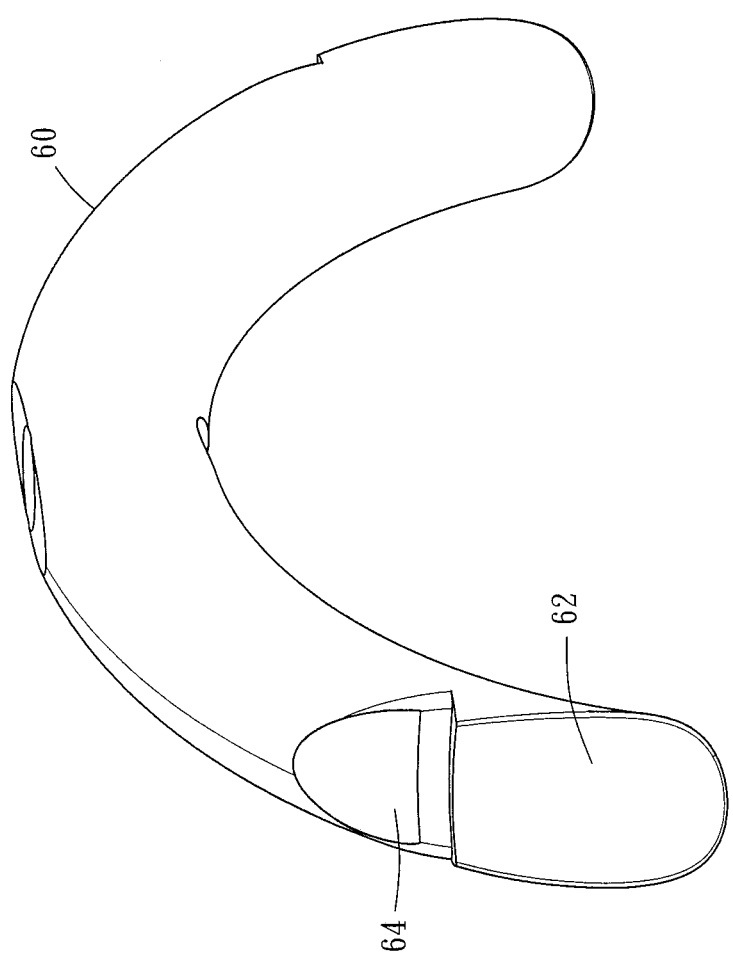
FIG. 5 is an enlarged view of one deflector of the ball screw in accordance with the present invention.

Referring to FIGS. 4 and 5 and FIG. 2 again, the deflectors 60 are set between the screw shaft 20 and the screw nut 30, each having a guide portion 62 located on each of two opposite ends thereof and disposed in the respective non-load path 54. The deflectors 60 have an outer diameter gradually reducing from the midpoint toward the two opposite ends thereof. Further, the outer diameter of the deflectors 60 is in the range of 0.8~1.1 times of the outer diameter of the rolling members 50. The design of the outer diameter of the deflectors 60 that reduces gradually from the midpoint toward the two opposite ends enables the guide surface area of the guide portions 62 to be minimized so that the deflectors 60 can accurately guide each rolling member 50 from the non-load paths 54 into the reflow channel 42 by means of the guide portions 62. Each deflector 60 further comprises a recess 64 located on each of the two opposite ends thereof and abutted to the respective guide portion 62 for engagement with respective one end of the return tube 40 to prevent interference between the deflectors 60 and the return tube 40 in installation.

It's worth mentioning that the external thread groove 22 of the screw shaft 20 has a Gothic-arch-shape; the cross section of the deflectors 60 is formed of two semicircles of the same diameter but different center of circle so that the steering guides 60 are fixed in a line contact with the external thread groove 22 of the screw shaft 20 to achieve the effect of structural stability. However, this Gothic-arch-shaped thread groove design is not a limitation.

Figure 6:
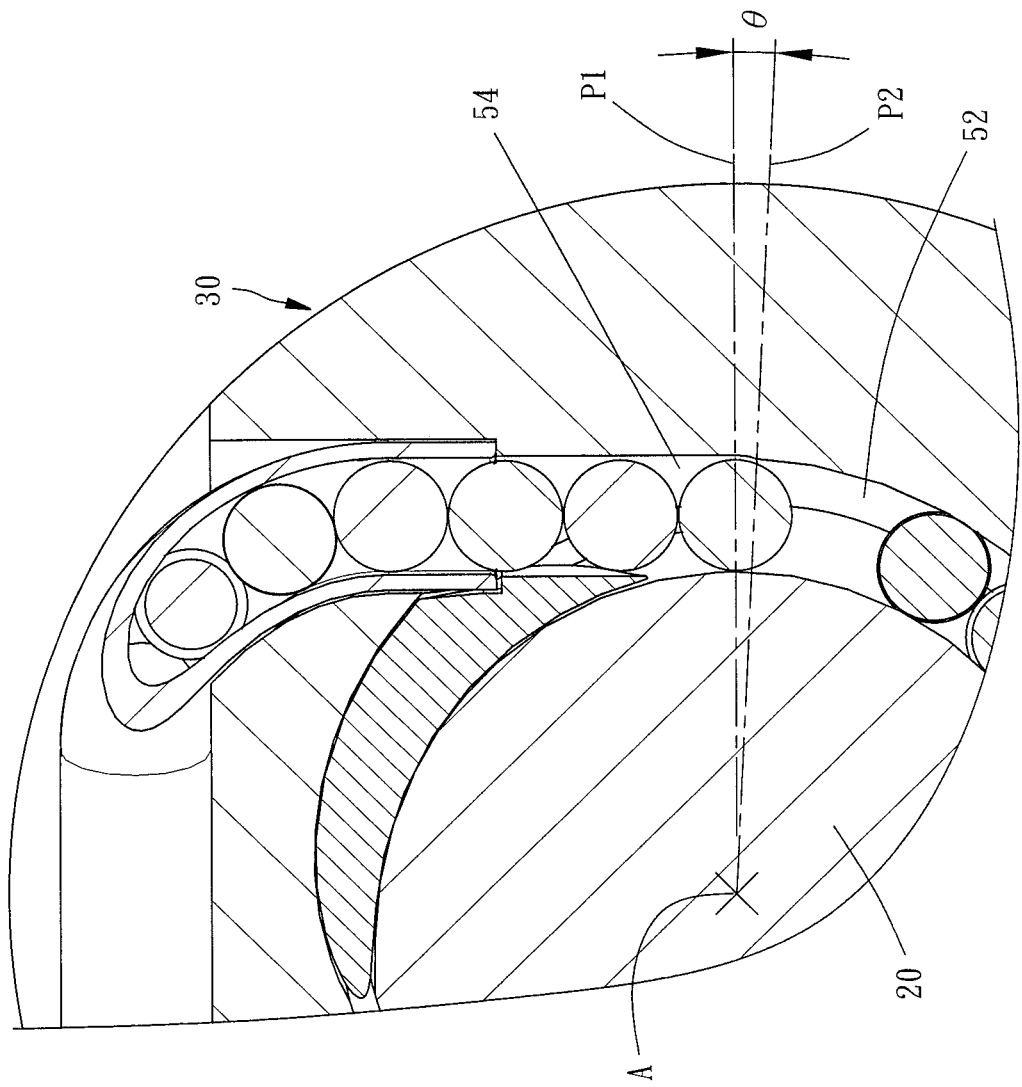
FIG. 6 is an enlarged view of a part of FIG. 4.

Referring to FIG. 6, the ball screw 10 defines an imaginary horizontal plane P1 and an imaginary sloping surface P2. The imaginary horizontal plane P1 intersects the imaginary sloping surface P2 at the center axis A of the screw shaft 20. The imaginary horizontal plane P1 passes through the non-load paths 54. The imaginary sloping surface P2 passes through the junction between the non-load paths 54 and the load path 52. Moreover, the imaginary sloping surface P2 defines a negative included angle θ with respect to the imaginary horizontal plane P1, and the angle of the negative included angle θ is the angle at which each rolling member 50 breaks away from the load path 52, and this negative included angle θ ranges from 1 to 3 degrees. It is to be noted that according to angle definition, the angle of rotation toward the counterclockwise direction is called the positive angle, and the angle of rotation toward the clockwise direction is called the negative angle. From the direction of FIG. 6, the imaginary sloping surface P2 is inclined by an angle relative to the imaginary horizontal plane P1 in the clockwise direction, so the angle between the two can be regarded as a negative angle.

Figure 7:
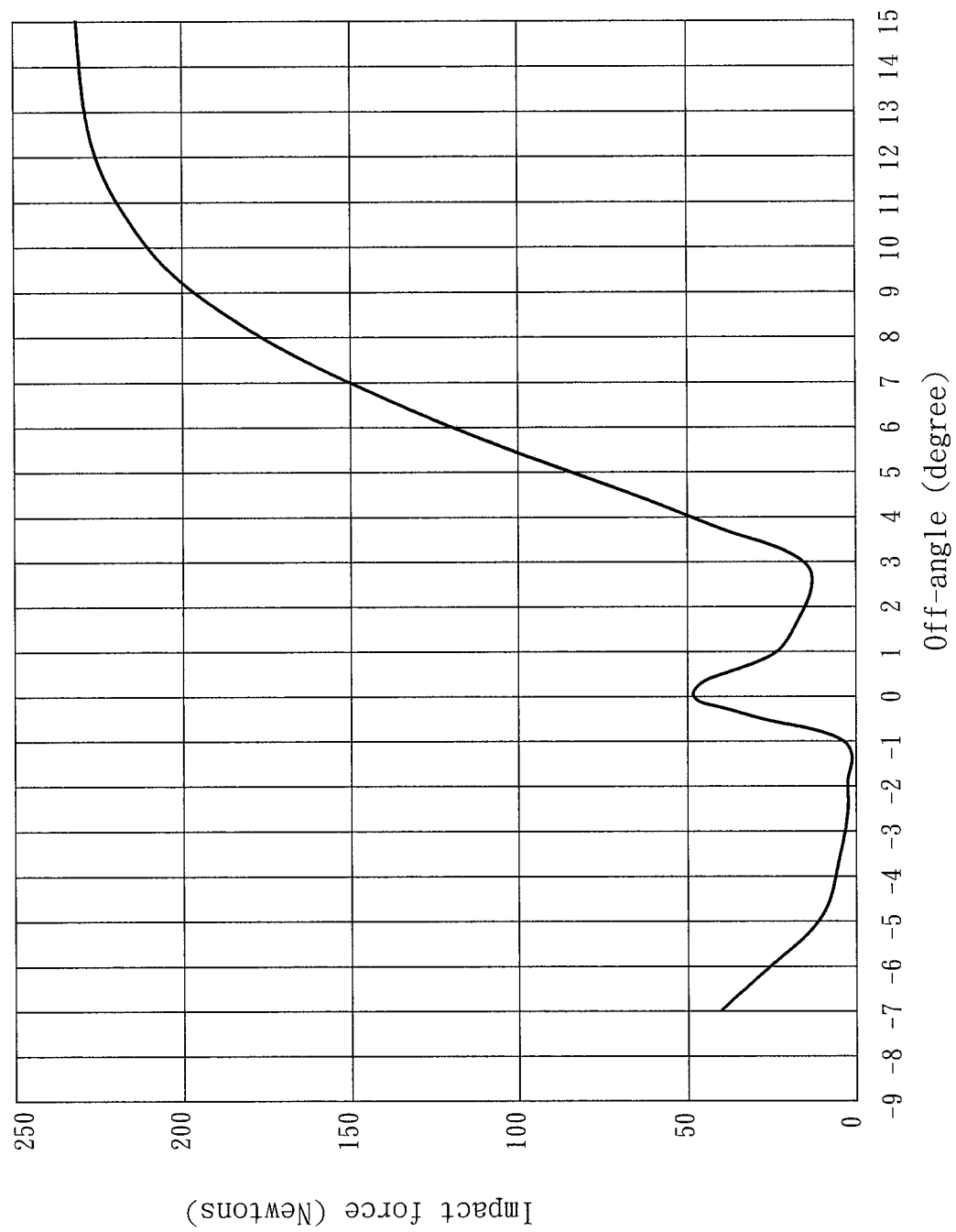
FIG. 7 is an impact-vs-off-angle curve, showing the relationship between the impact force on the return tube and the off-angle of the rolling member.

Referring to FIG. 7, FIG. 7 shows the impact force of the rolling members 50 on the return tube 40 at different off-angles. It can be seen from the figure that the impact force of the rolling member 50 between the minus 1 degree and the minus 3 degrees is the lowest to the return tube 40 and the impact force at this time is about 2.5 Newtons (N) to 3.8 Newtons (N). As for the conventional technology, the off-angle is generally above 14 degrees, at which the impact force on the return tube 40 is as high as 230 Newtons (N).

It can be seen from the above that the ball screw 10 of the present invention effectively changes the angle at which the rolling member 50 is released from the load path 52 so that the impact force exerted on the return tube 40 by the rolling member 50 upon entering the reflow channel 42 can be minimized, smoothening the operation and reducing operational noise.

What is claimed is:

1. A ball screw, comprising:
    a screw shaft comprising an external thread groove around the periphery thereof;
    a screw nut threaded onto said screw shaft and movable axially along said screw shaft, said screw nut comprising an internal thread groove and two guide grooves on an inner peripheral surface thereof, said internal thread groove of said screw nut defining with said external thread groove of said screw shaft a load path, each said guide groove of said screw nut defining with said external thread groove of said screw shaft a respective non-load path, each said non-load path having one end thereof connected to said load path;
    a return tube mounted in said screw nut and defining therein a reflow channel, said reflow channel having two opposite ends thereof respectively connected to an opposite end of each said non-load path so that said reflow channel, said two non-load paths and said load path create a circulation path;
    a plurality of rolling members movably mounted in said circulation path; and
    a deflector mounted between said screw shaft and said screw nut, said deflector having a guide portion located on each of two opposite ends thereof and respectively disposed in said non-load path;
    wherein the screw nut is provided at an outer peripheral surface thereof with a flat portion;
    wherein said ball screw defines an imaginary horizontal plane parallel to the flat portion of the screw nut and an imaginary sloping surface, said imaginary horizontal plane intersecting said imaginary sloping surface at the center axis of said screw shaft, said imaginary horizontal plane passing through said non-load paths, said imaginary sloping surface passing through the junction between said non-load paths and said load path, said imaginary sloping surface defining a negative included angle with respect to said imaginary horizontal plane, said negative included angle ranging from 1 to 3 degrees.

2. The ball screw as claimed in claim 1, wherein said screw nut comprises two mounting holes located on the outer peripheral surface thereof; and said return tube has the two opposite ends thereof respectively mounted in said mounting holes.

3. The ball screw as claimed in claim 1, wherein the cross section of said deflector is formed of two semicircles of the same diameter but different center of circle.

4. The ball screw as claimed in claim 1, wherein each of the two opposite ends of said deflector comprises a recess abutted to the respective said guide portion; and one of the recesses of said deflector is engaged with one end of said return tube.

5. The ball screw as claimed in claim 1, wherein said deflector has an outer diameter gradually reducing from the midpoint toward the two opposite ends thereof, and the outer diameter of said deflector reduces as it extends from the midpoint to the two opposite ends from a maximum of 1.1 times of the outer diameter of said rolling members down to 0.8 times of the outer diameter of said rolling members.

* * * * *